(12) United States Patent
Vanhoof et al.

(10) Patent No.: US 10,344,513 B2
(45) Date of Patent: Jul. 9, 2019

(54) COMPONENT FOR VEHICLE INTERIOR

(71) Applicant: Shanghai Yanfeng Jinqiao Automotive Trim Systems Co. Ltd, Novi, MI (US)

(72) Inventors: Randal John Vanhoof, Zeeland, MI (US); Amit Mukund Patankar, Holland, MI (US); John Grooters, Zeeland, MI (US); Chris J Harmelink, Wyoming, MI (US)

(73) Assignee: Shanghai Yangeng Jinqiao Automotive Trim Systems Co. Ltd., Novi, MI (US)

( * ) Notice: Subject to any disclaimer, the term of this patent is extended or adjusted under 35 U.S.C. 154(b) by 20 days.

(21) Appl. No.: 15/680,382

(22) Filed: Aug. 18, 2017

(65) Prior Publication Data

US 2019/0055765 A1  Feb. 21, 2019

(51) Int. Cl.
| | |
|---|---|
| *E05D 13/00* | (2006.01) |
| *E05C 21/00* | (2006.01) |
| *E05B 83/32* | (2014.01) |
| *B60N 3/10* | (2006.01) |
| *B60R 7/04* | (2006.01) |

(52) U.S. Cl.
CPC .............. *E05D 13/00* (2013.01); *E05B 83/32* (2013.01); *E05C 21/00* (2013.01); *B60N 3/101* (2013.01); *B60R 7/04* (2013.01)

(58) Field of Classification Search
CPC ........... E05D 13/00; E05C 21/00; B60R 7/04; B60N 3/101; E05B 83/32
USPC .................. 296/24.34, 37.8, 37.12, 37.14
See application file for complete search history.

(56) References Cited

U.S. PATENT DOCUMENTS

| | | | |
|---|---|---|---|
| 5,067,625 A | 11/1991 | Numata | |
| 5,210,906 A | 5/1993 | Aihara et al. | |
| 6,059,243 A | 5/2000 | Hikage et al. | |
| 6,264,273 B1 | 7/2001 | Waters, Sr. | |
| 6,499,785 B2 * | 12/2002 | Eguchi | B60R 7/04 |
| | | | 160/201 |
| 7,287,795 B1 * | 10/2007 | Thomas | B60R 7/04 |
| | | | 296/24.34 |
| 8,235,442 B2 | 8/2012 | Spitler et al. | |
| 8,579,348 B1 | 11/2013 | Myers | |

(Continued)

FOREIGN PATENT DOCUMENTS

| | | |
|---|---|---|
| WO | 2015100254 A1 | 7/2015 |
| WO | 2017201190 A1 | 11/2017 |

OTHER PUBLICATIONS

International Search Report and Written Opinion from the International Searching Authority for International Patent Application No. PCT/US2017/033149 dated Aug. 16, 2017 (in English) (14 pages).

*Primary Examiner* — Jason S Morrow
*Assistant Examiner* — E Turner Hicks (57) ABSTRACT

A component for a vehicle interior is disclosed. The vehicle trim component may comprise a base comprising a compartment; a cover coupled to the base configured for movement relative to the compartment; a blocker coupled to the base configured to selectively engage with the cover; and a mechanism coupled to the blocker. The mechanism may be configured to move the blocker between a deployed position when the cover is not engaged with the blocker and a retracted position when the cover is engaged with the blocker.

5 Claims, 7 Drawing Sheets

(56) References Cited

U.S. PATENT DOCUMENTS

| | | |
|---|---|---|
| 2003/0137158 A1 | 7/2003 | Nakanishi et al. |
| 2008/0083517 A1 | 4/2008 | Ogawa |
| 2008/0231060 A1 | 9/2008 | Carabalona et al. |
| 2009/0072568 A1 | 3/2009 | Luginbill et al. |
| 2011/0049157 A1* | 3/2011 | Nakamura ................ B60R 7/04 220/345.1 |
| 2011/0215605 A1 | 9/2011 | Spitler et al. |
| 2014/0062103 A1 | 3/2014 | Gillis |
| 2015/0053357 A1* | 2/2015 | Reus ....................... E04H 4/082 160/201 |
| 2015/0283958 A1 | 10/2015 | Hipshier |

\* cited by examiner

COMPONENT FOR VEHICLE INTERIOR

FIELD

The present invention relates to a component for a vehicle interior.

BACKGROUND

It is known in motor vehicles to provide a component (e.g. vehicle trim component, console, center console, floor console, arm rest, etc.) for the vehicle interior. It is also known to provide a storage compartment within the component. It is further known to provide a cover (e.g. door, tambour door, shade, blind, roller blind, etc.) that is movable into and out of a section of the component to cover and uncover the storage compartment. Conventional components provide an open gap to receive the cover as it is moved relative to the storage compartment. However, materials and objects placed on top of the cover may accidentally fall through the gap and become lost within the interior of the component. One conventional system attempts to solve this problem by including a popup mechanism on the cover that retracts as the cover is moved into the component. However, this solution does not block the gap itself, which may still allow materials and objects to be lost within the interior of the component. It would be advantageous to provide an improved component for a vehicle interior with a mechanism that blocks or closes the gap when the cover is not situated within a particular section of the component.

SUMMARY

The present invention relates to a vehicle trim component configured to provide support for an object. The vehicle trim component may comprise a base comprising a compartment; a cover coupled to the base configured for movement from a closed position to an open position through an intermediate position; and a blocker coupled to the base. The blocker may be configured for movement between a deployed position and a retracted position. The cover may comprise an edge configured to move the blocker from the deployed position to the acted position. The edge may be configured to move the blocker from the deployed position to the retracted position as the cover moves from the closed position to the intermediate position. The blocker may be configured to be in the deployed position when the cover is in the closed position; the blocker may be configured to be in the retracted position when the cover is in the intermediate position and the open position. The blocker may be configured to move from the deployed position to the retracted position as the cover is moved from the closed position to the intermediate position; the blocker may be configured to move from the retracted position to the deployed position as the cover is moved from the intermediate position to the closed position. The base may comprise a spring configured to move the blocker from the retracted position toward the deployed position. The blocker may be configured to compress the spring as the blocker moves from the deployed position toward the retraced position; the spring may be configured to extend to move the blocker toward the deployed position. The blocker may be configured to extend the spring as the blocker moves from the deployed position toward the retraced position; the spring may be configured to compress to move the blocker toward the deployed position. The blocker may be configured to prevent the object from moving from the cover into the compartment. The blocker may be configured to retain the object as the cover moves from the closed position toward the open position.

The present invention also relates to a vehicle trim component. The vehicle trim component comprises a base; a cover coupled to the base configured for movement from a closed position to an open position; and a mechanism coupled to the base. The mechanism may comprise a blocker configured for movement between a deployed position and a retracted position. The mechanism may comprise a spring configured to move the blocker from the retracted position to the deployed position. The mechanism may comprise at least one pivot engaged with the base. The spring may be engaged with the pivot and may be configured to rotate the blocker about the pivot from the retracted position toward the deployed position. The mechanism may comprise at least one counterweight; the counterweight may be configured to rotate the blocker from the retracted position toward the deployed position.

The present invention further relates to a vehicle trim component. The vehicle trim component may comprise a base comprising a compartment; a cover coupled to the base configured for movement relative to the compartment; a first blocker coupled to the base configured to selectively engage with the cover; and a first mechanism coupled to the first blocker. The first mechanism may be configured to move the first blocker between a deployed position when the cover is not engaged with the first blocker and a retracted position when the cover is engaged with the first blocker. The first blocker may be coupled to the base by at least one pivot; the first blocker may rotate about the at least one pivot to move between the deployed position and the retracted position. The first mechanism may comprise a spring engaged with the at least one pivot configured to rotate the blocker about the at least one pivot from the retracted position toward the deployed position. The first mechanism may comprise a spring configured to provide a biasing force to hold the first blocker member in the deployed position and to compress to move the first blocker to the retracted position when the cover engages the first blocker with a force greater than the biasing force. The first mechanism may comprise a spring configured to provide a biasing force to hold the first blocker in the deployed position and to expand to move the first blocker to the retracted position when the cover engages the first blocker with a force greater than the biasing force. The vehicle trim component may comprise (a) a second blocker coupled to the base opposite the first blocker and configured to selectively engage with the cover; and (b) a second mechanism coupled to the second blocker. The second mechanism may be configured to move the second blocker between a deployed position when the cover is not engaged with the second blocker and a retracted position when the cover is engaged with the second blocker.

DESCRIPTION

According to an exemplary embodiment as shown schematically in FIGS. 1A to 1D, a vehicle V is shown including an interior with a component or floor console FC. Floor console FC may comprise a base B, a cover C, and a storage compartment SC. As shown schematically in FIGS. 1C and 1D, cover C may be configured to move relative to storage compartment SC so as to cover and uncover storage compartment SC.

According to an exemplary embodiment as shown schematically in FIGS. 2A to 2D, an interior I of a vehicle having a floor console FC (e.g. vehicle trim component, console, center console, component, arm rest, etc.) is shown. Floor console FC may comprise a base B, a cover C, a storage compartment SC, and a mechanism M. Cover C may be configured to move relative to storage compartment SC into and out of an interior portion of floor console FC. According to an exemplary embodiment, cover C may be configured to store within a forward position of floor console FC (see FIG. 2D), a rearward portion of floor console FC (see FIG. 2B), or both. According to an exemplary embodiment, cover C may comprise a shelf or cover for a second storage compartment in the rear portion of floor console FC when cover C is positioned in the rearward location (see FIG. 2B). According to an exemplary embodiment floor console FC may comprise a gap G configured to allow cover C to move into the interior of floor console FC. According to an exemplary embodiment, mechanism M may be configured to engage with cover C. Mechanism M may be configured to move between a deployed position blocking or covering gap G (See FIG. 2B) and a retracted position opening gap G. Mechanism M may be configured to transition from the deployed position to the retracted position when engaged with cover C.

Figures 1A, 1B:
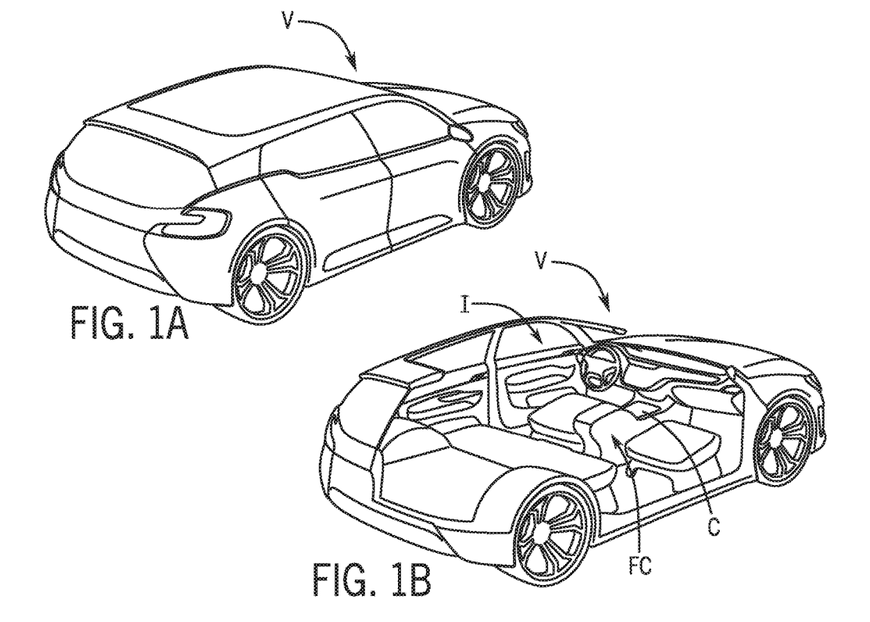
FIG. 1A is a schematic perspective view of a vehicle according to an exemplary embodiment.
FIG. 1B is a schematic perspective cut-away view of a vehicle showing the interior of the vehicle according to an exemplary embodiment.
Figure 1C:
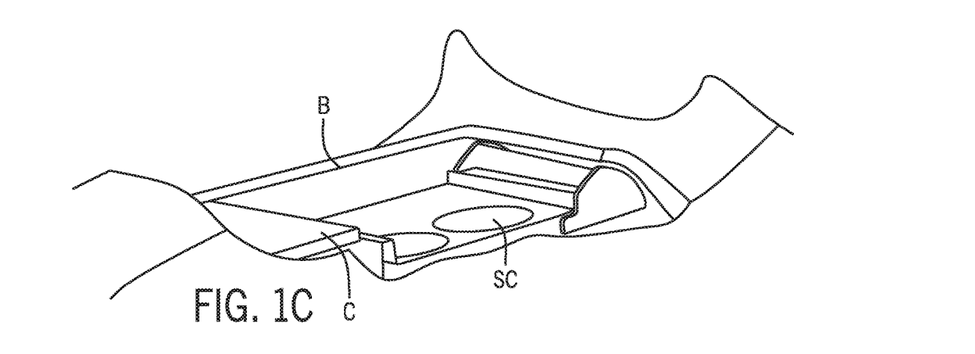
FIG. 1C is a schematic perspective view of a component of a vehicle interior according to an exemplary embodiment.
Figure 1D:
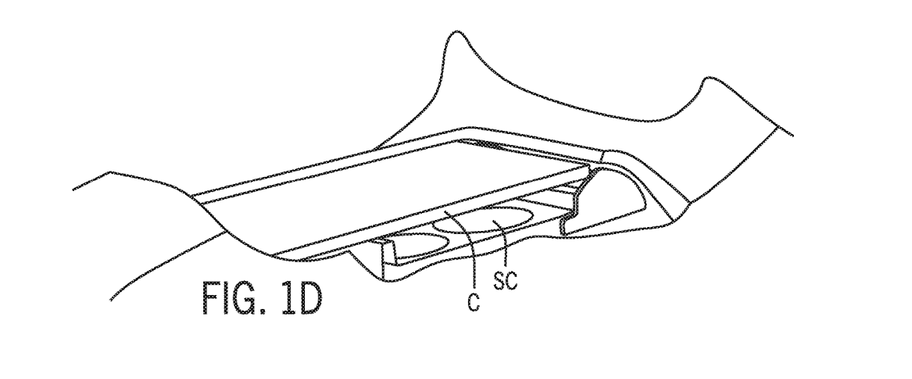
FIG. 1D is a schematic perspective view of a component of a vehicle interior according to an exemplary embodiment.
Figures 2A, 2B:
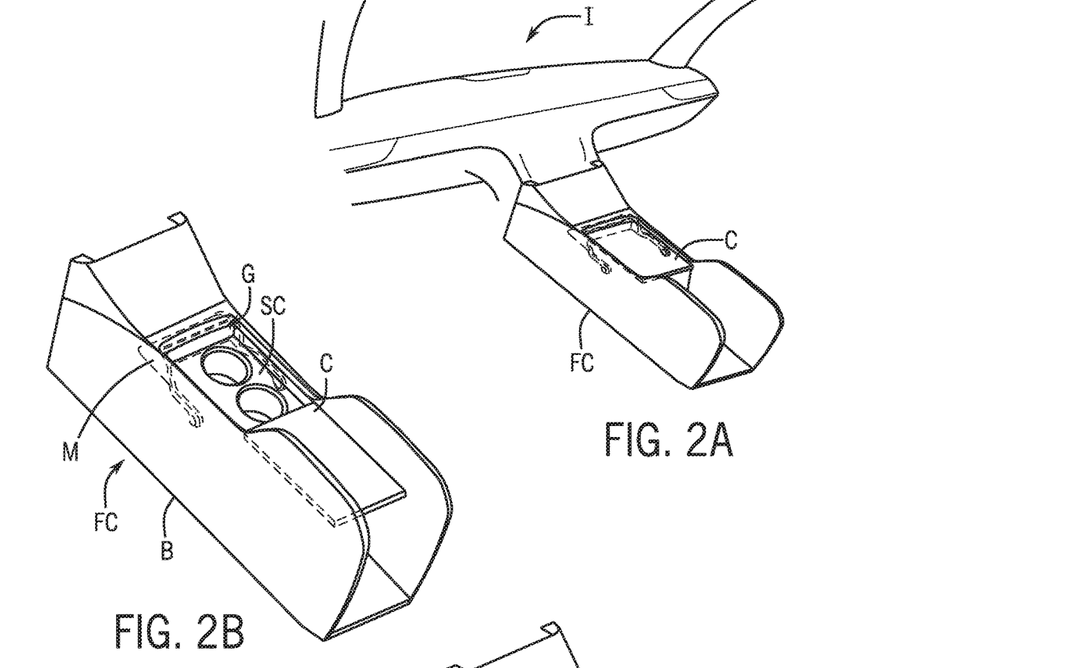
FIG. 2A is a schematic perspective view of a component of a vehicle interior according to an exemplary embodiment.
FIGS. 2B to 2D are schematic perspective views of a component of a vehicle interior with a mechanism between a deployed position and a retracted position according to an exemplary embodiment.
Figures 2C, 2D:
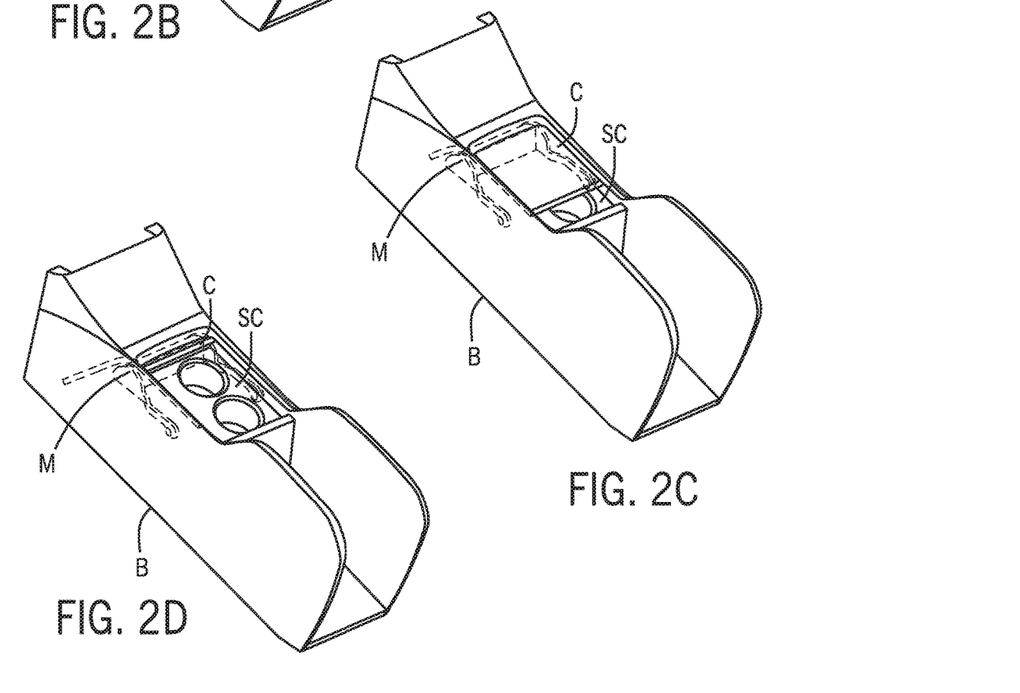
Figures 3A, 3B, 3C, 3D:
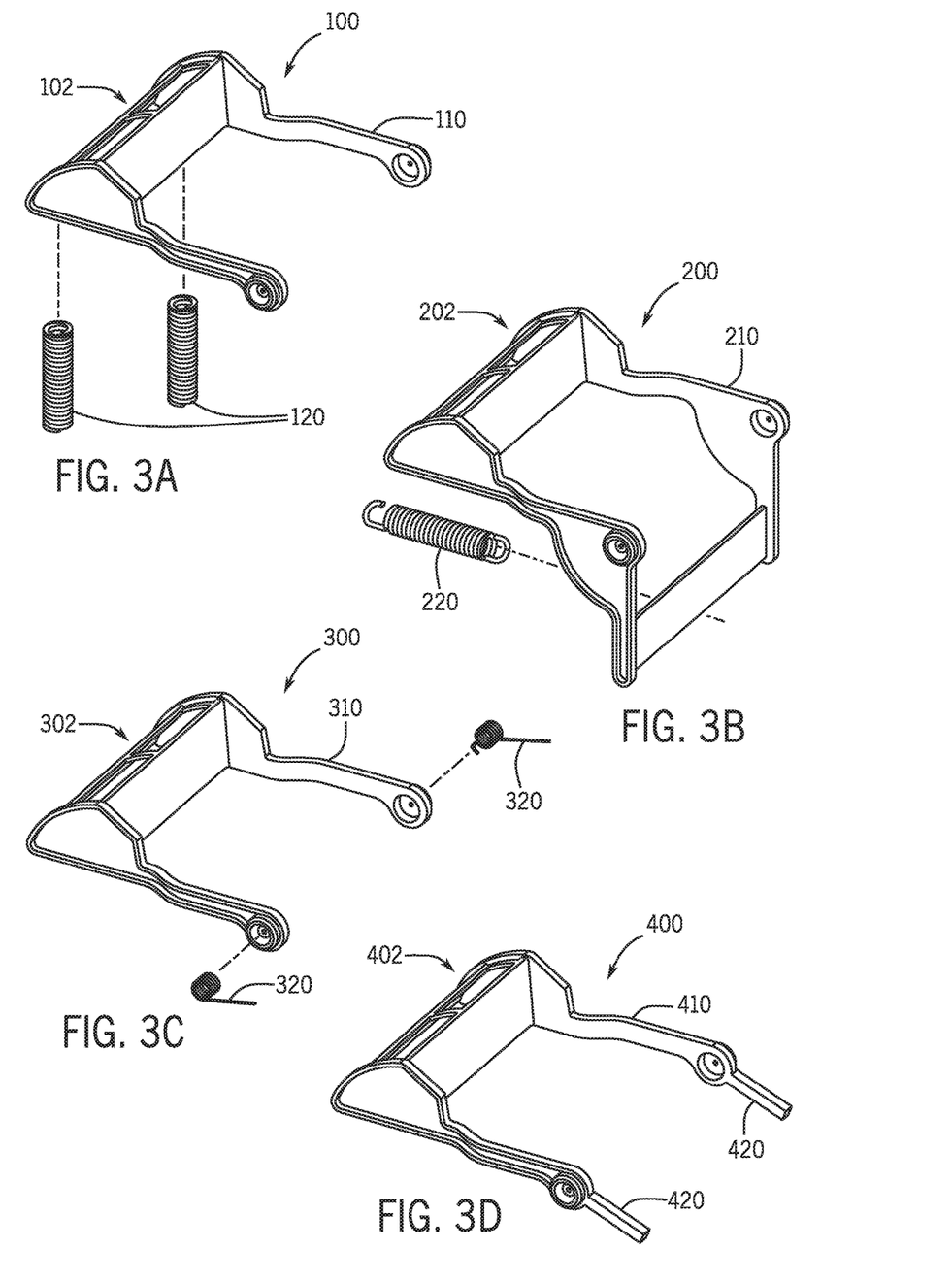
FIG. 3A is a schematic perspective view of a mechanism for a component of a vehicle interior according to an exemplary embodiment.
FIG. 3B is a schematic perspective view of a mechanism for a component of a vehicle interior according to an exemplary embodiment.
FIG. 3C is a schematic perspective view of a mechanism for a component of a vehicle interior according to an exemplary embodiment.
FIG. 3D is a schematic perspective view of a mechanism for a component of a vehicle interior according to an exemplary embodiment.

According to an exemplary embodiment as shown schematically in FIG. 3A, a mechanism 100 for blocking or closing a gap in a vehicle interior component is shown. Mechanism 100 may comprise a blocker 102, a connector 110, and a spring 120. Blocker 102 may be configured to move between a deployed position and a retracted position when mechanism 100 is coupled to a base of a vehicle interior component (See FIGS. 4A to 4H). Connector 110 may be configured to couple mechanism 100 to a base of a vehicle interior component and may be coupled to blocker 102 to facilitate movement between the deployed position and the retracted position. Spring 120 may be configured to engage with a base of a vehicle interior component and provide a biasing force to blocker 102. The biasing force may bias blocker 102 in the deployed position when mechanism 100 is coupled to a base of a vehicle interior component (See FIGS. 4A to 4H). According to an exemplary embodiment, spring 120 may comprise a single spring or series of springs configured to compress as blocker 102 moves to the retracted position when blocker 102 is subjected to a force greater than the biasing force.

According to an exemplary embodiment as shown schematically in FIG. 3B, a mechanism 200 for blocking or closing a gap in a vehicle interior component is shown. Mechanism 200 may comprise a blocker 202, a connector 210, and a spring 220. Blocker 202 may be configured to move between a deployed position and a acted position when mechanism 200 is coupled to a base of a vehicle interior component (See FIGS. 5A to 5H). Connector 210 may be configured to couple mechanism 200 to a base of a vehicle interior component and may be coupled to blocker 202 to facilitate movement between the deployed position and the retracted position. Spring 220 may be configured to engage with a base of a vehicle interior component and provide a biasing force to blocker 202. According to an exemplary embodiment, spring 220 may provide the biasing force through connector 210. The biasing force may bias blocker 202 in the deployed position when mechanism 200 is coupled to a base of a vehicle interior component (See FIGS. 5A to 5H). According to an exemplary embodiment, spring 220 may comprise a single spring or series of springs configured to expand as blocker 202 moves to the retracted position when blocker 202 is subjected to a force greater than the biasing force.

According to an exemplary embodiment as shown schematically in FIG. 3C, a mechanism 300 for blocking or closing a gap in a vehicle interior component is shown. Mechanism 300 may comprise a blocker 302, a connector 310, and a spring 320. Blocker 302 may be configured to move between a deployed position and a acted position when mechanism 300 is coupled to a base of a vehicle interior component (See FIGS. 6A to 6H). Connector 310 may be configured to couple mechanism 300 to a base of a vehicle interior component and may be coupled to blocker 302 to facilitate movement between the deployed position and the retracted position. Spring 320 may be configured to engage with a base of a vehicle interior component and provide a biasing force to blocker 302. According to an exemplary embodiment, spring 320 may provide the biasing force through connector 310. The biasing force may bias blocker 302 in the deployed position when mechanism 300 is coupled to a base of a vehicle interior component (See FIGS. 6A to 6H). According to an exemplary embodiment, spring 320 may comprise a single spring or series of swings configured to pivot blocker 302 to the retracted position when blocker 302 is subjected to a force greater than the biasing force.

According to an exemplary embodiment as shown schematically in FIG. 3D, a mechanism 400 for blocking or closing a gap in a vehicle interior component is shown. Mechanism 400 may comprise a blocker 402, a connector 410, and a weight 420. Blocker 402 may be configured to move between a deployed position and a acted position when mechanism 400 is coupled to a base of a vehicle interior component (See FIGS. 7A to 7H). Connector 410 may be configured to couple mechanism 400 to a base of a vehicle interior component and may be coupled to blocker 402 to facilitate movement between the deployed position and the retracted position. Weight 420 may be configured to engage with a base of a vehicle interior component and provide a biasing force to blocker 302. According to an exemplary embodiment, weight 420 may provide the biasing force through connector 410. The biasing force may bias blocker 402 in the deployed position when mechanism 400 is coupled to a base of a vehicle interior component (See FIGS. 7A to 7H). According to an exemplary embodiment, weight 420 may comprise a counterweight coupled to connector 410 configured to pivot blocker 402 to the retracted position when blocker 402 is subjected to a force greater than the biasing force.

According to an exemplary embodiment as shown schematically in FIGS. 4A to 4H, a component 1000 (e.g. vehicle trim component, console, center console, floor console, storage compartment, arm rest, etc.) for a vehicle interior is shown. Component 1000 may comprise a base 21, a compartment 31, a cover 10, and a mechanism 100. Cover 10 may be coupled to base 21 and configured to move relative to compartment 31. According to an exemplary embodiment cover 10 may be configured to move from a closed position or rearward position to an open position or forward position through an intermediate position. According to an exemplary embodiment, cover 10 may be configured to be stored within a forward position of component 1000 (see FIGS. 4G and 4H), a rearward portion of component 1000 (see FIGS. 4A and 4B), or both. According to an exemplary embodiment, cover 10 may provide a shelf or cover for a second compartment in the rearward portion of component 1000.

Figure 4A:
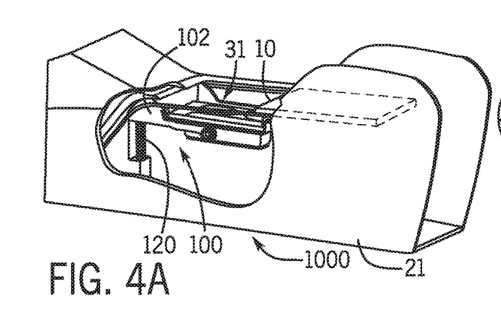
FIG. 4A is a schematic perspective cut away view of a component of a vehicle interior with a mechanism in a deployed position according to an exemplary embodiment.
Figure 4B:
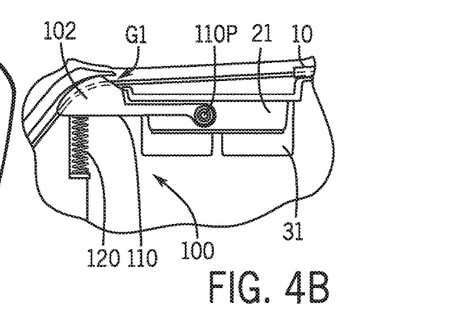
FIG. 4B is a schematic cut away side view of a component of a vehicle interior with a mechanism in a deployed position according to an exemplary embodiment.
Figure 4C:
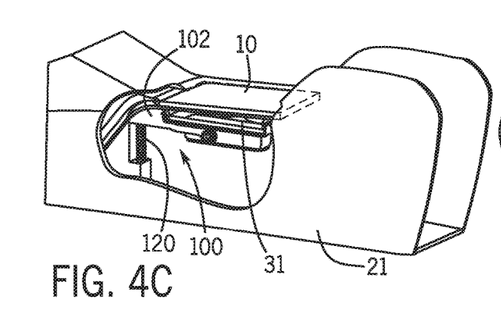
FIG. 4C is a schematic perspective cut away view of a component of a vehicle interior with a mechanism in a deployed position according to an exemplary embodiment.
Figure 4D:
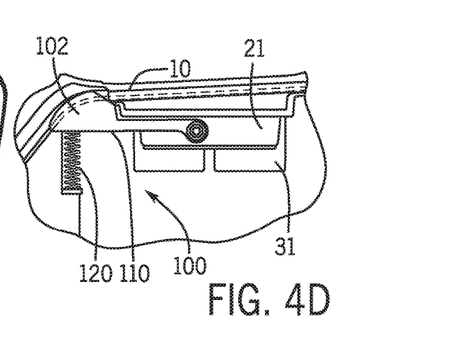
FIG. 4D is a schematic cut away side view of a component of a vehicle interior with a mechanism in a deployed position according to an exemplary embodiment.

According to an exemplary embodiment as shown schematically in FIGS. 4A and 4B, mechanism 100 may be coupled to base 21 and may be configured to selectively engage with cover 10. Mechanism 100 may comprise a blocker 102, a connector 110, and a spring 120. Blocker 102 may be configured to move between a deployed position covering a gap G1 between the compartment 31 and base 21 (see FIGS. 4A and 4B) when cover 10 is disengaged from blocker 102 and a retracted position (see FIGS. 4G and 4H) when cover 10 is engaged with blocker 102. According to an exemplary embodiment, cover 10 may comprise an edge configured to move blocker 102 from the deployed position to the retracted position. Gap G1 may be sized to receive cover 10. According to an exemplary embodiment, blocker 102 may be configured to prevent an object on a top surface of cover 10 from moving from cover 10 into component 1000. According to an exemplary embodiment, blocker 102 may be configured to retain an object on a top surface of cover 10 as cover 10 moves between the rearward position and the forward position.

According to an exemplary embodiment, connector 110 may be configured to couple mechanism 100 to base 21 and may be coupled to blocker 102 to facilitate movement between the deployed position and the retracted position. As shown schematically in FIG. 4B, mechanism 100 may comprise at least one pivot 110P coupled to connector 110 and engaged with base 21. Spring 120 may be configured to engage with base 21 and provide a biasing force to blocker 102. The biasing force may bias blocker 102 in the deployed position. According to an exemplary embodiment, spring 120 may comprise a single spring or series of springs configured to compress as blocker 102 moves to the retracted position when blocker 102 is subjected to a force greater than the biasing force.

According to an exemplary embodiment as shown schematically in FIGS. 4A to 4D, cover 10 is in the rearward position. Cover 10 may be configured to completely expose compartment 31, completely cover compartment 31, or partially cover a rear portion of compartment 31 dependent on the length of cover 10 and the size of compartment 31 when cover 10 is in the rearward position. When cover 10 is in the rearward position, cover 10 may be configured to be disengaged from blocker 102 with sufficient force to overcome the biasing force from spring 120. As shown schematically in FIGS. 4C and 4D, the edge of cover 10 may be configured to rest against blocker 120 to enclose compartment 31. When cover 10 is in the rearward position, blocker 102 may be in the deployed position blocking gap G1, spring 120 may be in an uncompressed rest state applying the biasing force to blocker 102, and connector 110 may be in a horizontal or raised position relative to pivot 110P.

Figure 4E:
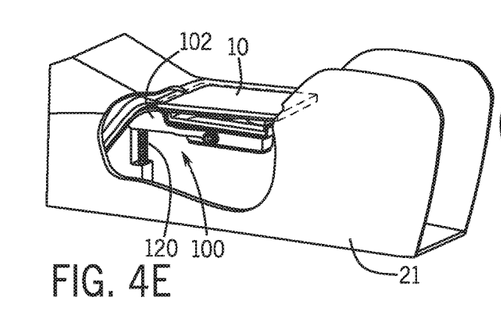
FIG. 4E is a schematic perspective cut away view of a component of a vehicle interior with a mechanism transitioning from a deployed position to a retracted position according to an exemplary embodiment.
Figure 4F:
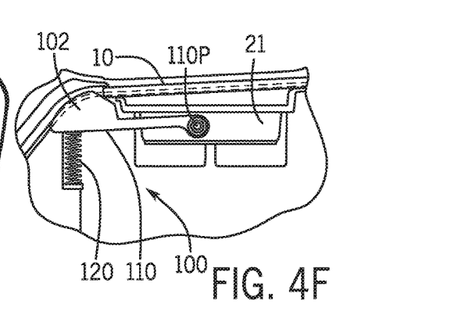
FIG. 4F is a schematic cut away side view of a component of a vehicle interior with a mechanism transitioning from a deployed position to a retracted position according to an exemplary embodiment.

According to an exemplary embodiment as shown schematically in FIGS. 4E and 4F, cover 10 is in the intermediate position. Cover 10 may be configured to completely cover compartment 31 or partially cover a forward portion of compartment 31 dependent on the length of cover 10 and the size of compartment 31 when cover 10 is in the intermediate position. As cover 10 moves from the rearward position to the intermediate position, the edge of cover 10 may engage blocker 102 with a force greater than the biasing force to begin moving blocker 102 from the deployed position to the retracted position. As the edge of cover 10 engages blocker 102, spring 120 may begin to compress and connector 110 may begin to pivot about pivot 110P so as to move blocker 102 toward the retracted position.

Figure 4G:
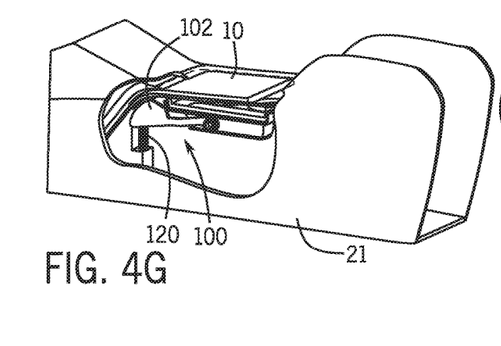
FIG. 4G is a schematic perspective cut away view of a component of a vehicle interior with a mechanism in a retracted position according to an exemplary embodiment.
Figure 4H:
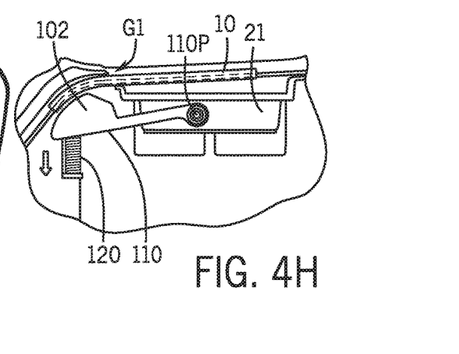
FIG. 4H is a schematic cut away side view of a component of a vehicle interior with a mechanism in a retracted position according to an exemplary embodiment.

According to an exemplary embodiment as shown schematically in FIGS. 4G and 4F, cover 10 is in the forward position. Cover 10 may be configured to completely expose compartment 31, completely cover compartment 31, or partially cover the forward portion of compartment 31 dependent on the length of cover 10 and the size of compartment 31 when cover 10 is in the forward position. When cover 10 is in the forward position, cover 10 may be configured to be fully engaged with blocker 102 with sufficient force to overcome the biasing force from spring 120. When cover 10 is in the forward position, blocker 102 may be in the retracted position exposing gap G1 to allow cover 10 to pass through gap G1, spring 120 may be in a compressed state, and connector 110 may be in a lowered position relative to pivot 110P. According to an exemplary embodiment, when cover 10 is in the forward position and spring 120 is compressed, spring 120 may continue to provide the biasing force to blocker 102 which in turn may bias cover 10 upwards to contact an upper inner surface of component 1000. Cover 10 contacting the upper inner surface of component 1000 may block gap G1 with the upper surface of cover 10 (See FIG. 4H).

According to an exemplary embodiment, component 1000 may comprise a second mechanism opposite mechanism 100. The second mechanism may be configured to selectively engage cover 10 and to close or block a second gap formed in the rearward portion of component 1000 as cover 10 moves from the rearward position to the intermediate or forward position. The second mechanism may be configured identically to mechanism 100 with a second blocker being equivalent to blocker 102. The second blocker may be configured to move between a deployed position when cover 10 may be disengaged from the second blocker and a retracted position when cover 10 is engaged with the second blocker.

According to an exemplary embodiment as shown schematically in FIGS. 5A to 5H, a component 2000 (e.g. vehicle trim component, console, center console, floor console, storage compartment, arm rest, etc.) for a vehicle interior is shown. Component 2000 may comprise a base 22, a compartment 32, a cover 10, and a mechanism 200. Cover 10 may be coupled to base 22 and configured to move relative to compartment 32. According to an exemplary embodiment, cover 10 may be configured to move from a closed position or rearward position to an open position or forward position through an intermediate position. According to an exemplary embodiment, cover 10 may be configured to be stored within a forward position of component 2000 (see FIGS. 5G and 5H), a rearward portion of component 2000 (see FIGS. 5A and 5B), or both. According to an exemplary embodiment, cover 10 may provide a shelf or cover for a second compartment in the rearward portion of component 2000.

Figure 5A:
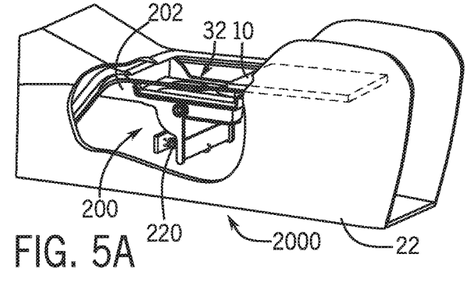
FIG. 5A is a schematic perspective cut away view of a component of a vehicle interior with a mechanism in a deployed position according to an exemplary embodiment.
Figure 5B:
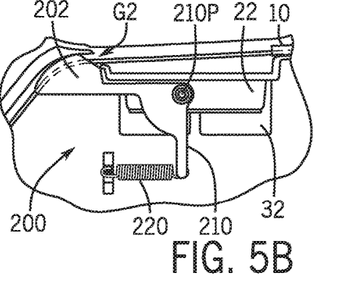
FIG. 5B is a schematic cut away side view of a component of a vehicle interior with a mechanism in a deployed position according to an exemplary embodiment.
Figure 5C:
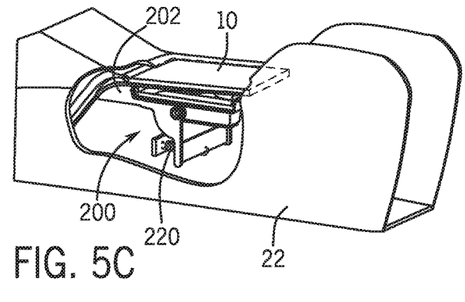
FIG. 5C is a schematic perspective cut away view of a component of a vehicle interior with a mechanism in a deployed position according to an exemplary embodiment.
Figure 5D:
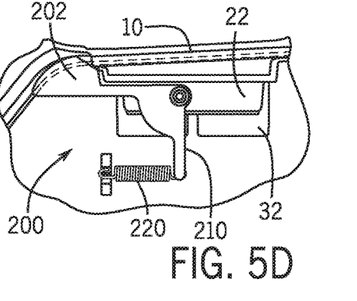
FIG. 5D is a schematic cut away side view of a component of a vehicle interior with a mechanism in a deployed position according to an exemplary embodiment.

According to an exemplary embodiment as shown schematically in FIGS. 5A and 5B, mechanism 200 may be coupled to base 22 and may be configured to selectively engage with cover 10. Mechanism 200 may comprise a blocker 202, a connector 210, and a spring 220. Blocker 202 may be configured to move between a deployed position covering a gap G2 between the compartment 32 and base 22 (See FIGS. 5A and 5B) when cover 10 is disengaged from blocker 202 and a retracted position (See FIGS. 5G and 5H) when cover 10 is engaged with blocker 202. According to an exemplary embodiment, cover 10 may comprise an edge configured to move blocker 202 from the deployed position to the retracted position. Gap G2 may be sized to receive cover 10. According to an exemplary embodiment, blocker 202 may be configured to prevent an object on a top surface of cover 10 from moving from cover 10 into component 2000. According to an exemplary embodiment, blocker 202 may be configured to retain an object on a top surface of cover 10 as cover 10 moves between the rearward position and the forward position.

According to an exemplary embodiment, connector 210 may be configured to couple mechanism 200 to base 22 and may be coupled to blocker 202 to facilitate movement between the deployed position and the retracted position. As shown schematically in FIG. 5B, mechanism 200 may comprise at least one pivot 210P coupled to connector 210 and engaged with base 22. Spring 220 may be configured to engage with base 22 and provide a biasing force to blocker 202. The biasing force may bias blocker 202 in the deployed position. According to an exemplary embodiment, spring 220 may comprise a single spring or series of springs configured to expand as blocker 202 moves to the retracted position when blocker 202 is subjected to a force greater than the biasing force.

According to an exemplary embodiment as shown schematically in FIGS. 5A to 5D, cover 10 is in the rearward position. Cover 10 may be configured to completely expose compartment 32, completely cover compartment 32, or partially cover a rear portion of compartment 32 dependent on the length of cover 10 and the size of compartment 32 when cover 10 is in the rearward position. When cover 10 is in the rearward position, cover 10 may be configured not to engage blocker 202 with sufficient force to overcome the biasing force from spring 220. As shown schematically in FIGS. 5C and 5D, the edge of cover 10 may be configured to rest against blocker 120 to enclose compartment 32. When cover 10 is in the rearward position, blocker 202 may be in the deployed position blocking gap G2, spring 220 may be in a non-expanded rest state applying the biasing force to blocker 202, and connector 210 may be in a horizontal or raised position relative to pivot 210P.

Figure 5E:
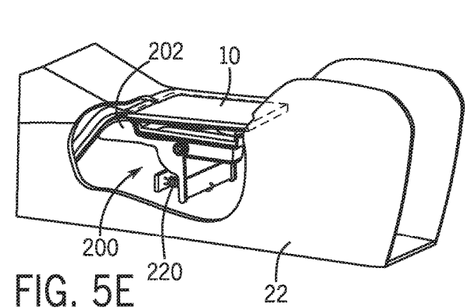
FIG. 5E is a schematic perspective cut away view of a component of a vehicle interior with a mechanism transitioning from a deployed position to a retracted position according to an exemplary embodiment.
Figure 5F:
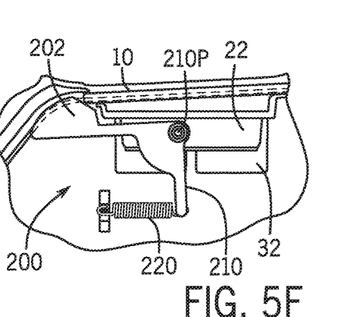
FIG. 5F is a schematic cut away side view of a component of a vehicle interior with a mechanism transitioning from a deployed position to a retracted position according to an exemplary embodiment.

According to an exemplary embodiment as shown schematically in FIGS. 5E and 5F, cover 10 is in the intermediate position. Cover 10 may be configured to completely cover compartment 32 or partially cover a forward portion of compartment 32 dependent on the length of cover 10 and the size of compartment 32 when cover 10 is in the intermediate position. As cover 10 moves from the rearward position to the intermediate position, the edge of cover 10 may engage blocker 202 with a force greater than the biasing force to begin moving blocker 202 from the deployed position to the retracted position. As the edge of cover 10 engages blocker 202, spring 220 may begin to compress and connector 220 may begin to pivot about pivot 220P so as to move blocker 202 toward the retracted position.

Figure 5G:
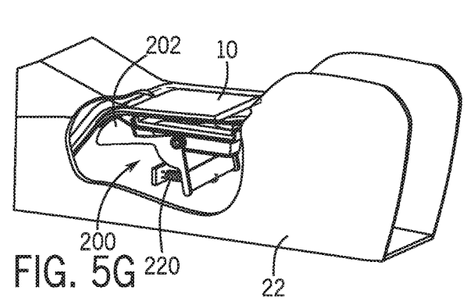
FIG. 5G is a schematic perspective cut away view of a component of a vehicle interior with a mechanism in a retracted position according to an exemplary embodiment.
Figure 5H:
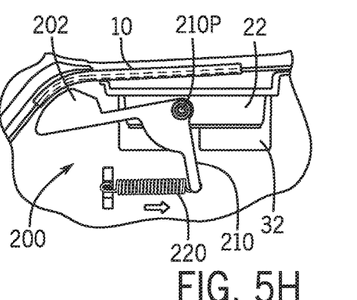
FIG. 5H is a schematic cut away side view of a component of a vehicle interior with a mechanism in a retracted position according to an exemplary embodiment.

According to an exemplary embodiment as shown schematically in FIGS. 5G and 5F, cover 10 is in the forward position. Cover 10 may be configured to completely expose compartment 32, completely cover compartment 32, or partially cover the forward portion of compartment 32 dependent on the length of cover 10 and the size of compartment 32 when cover 10 is in the forward position. When cover 10 is in the forward position, cover 10 may be configured to be fully engaged with blocker 202 with sufficient force to overcome the biasing force from spring 220. When cover 10 is in the forward position, blocker 202 may be in the retracted position exposing gap G2 to allow cover 10 to pass through gap G2, spring 220 may be in an expanded state, and connector 220 may be in a lowered position relative to pivot 210P. According to an exemplary embodiment, when cover 10 is in the forward position and spring 220 is expanded, spring 220 may continue to provide the biasing force to blocker 202 which in turn may bias cover 10 upwards to contact an upper inner surface of component 2000. Cover 10 contacting the upper inner surface of component 2000 may block gap G2 with the upper surface of cover 10 (See FIG. 5H).

According to an exemplary embodiment, component 2000 may comprise a second mechanism opposite mechanism 200. The second mechanism may be configured to selectively engage cover 10 and to close or block a second gap formed in the rearward portion of component 2000 as cover 10 moves from the rearward position to the intermediate or open position. The second mechanism may be configured identically to mechanism 200 with a second blocker being equivalent to blocker 202. The second blocker may be configured to move between a deployed position when cover 10 is not engaged with the second blocker and a retracted position when cover 10 is engaged with the second blocker.

According to an exemplary embodiment as shown schematically in FIGS. 6A to 6H, a component 3000 (e.g. vehicle trim component, console, center console, floor console, storage compartment, arm rest, etc.) for a vehicle interior is shown. Component 3000 may comprise a base 23, a compartment 33, a cover 10, and a mechanism 300. Cover 10 may be coupled to base 23 and configured to move relative to compartment 33. According to an exemplary embodiment, cover 10 may be configured to move from a closed position or rearward position to an open position or forward position through an intermediate position. According to an exemplary embodiment, cover 10 may be configured to be stored within a forward position of component 3000 (see FIGS. 6G and 6H), a rearward portion of component 3000 (see FIGS. 6A and 6B), or both. According to an exemplary embodiment, cover 10 may provide a shelf or cover for a second compartment in the rearward portion of component 3000.

Figure 6A:
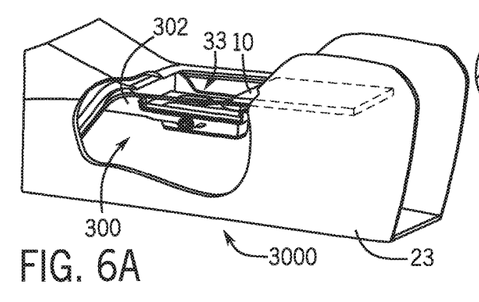
FIG. 6A is a schematic perspective cut away view of a component of a vehicle interior with a mechanism in a deployed position according to an exemplary embodiment.
Figure 6B:
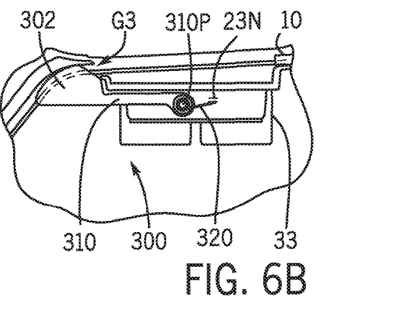
FIG. 6B is a schematic cut away side view of a component of a vehicle interior with a mechanism in a deployed position according to an exemplary embodiment.
Figure 6C:
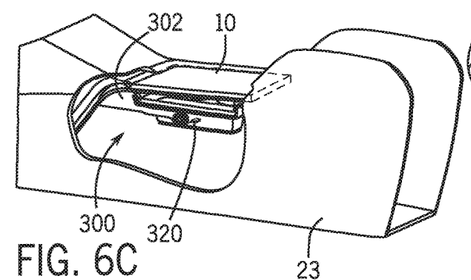
FIG. 6C is a schematic perspective cut away view of a component of a vehicle interior with a mechanism in a deployed position according to an exemplary embodiment.
Figure 6D:
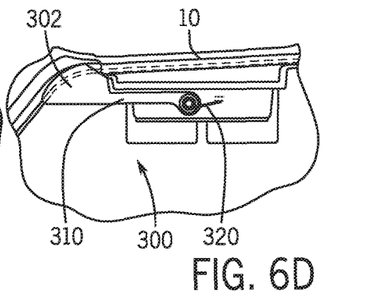
FIG. 6D is a schematic cut away side view of a component of a vehicle interior with a mechanism in a deployed position according to an exemplary embodiment.

According to an exemplary embodiment as shown schematically in FIGS. 6A and 6B, mechanism 300 may be coupled to base 23 and may be configured to selectively engage with cover 10. Mechanism 300 may comprise a blocker 302, a connector 310, and a spring 320. Blocker 302 may be configured to move between a deployed position covering a gap G3 between the compartment 33 and base 23 (See FIGS. 6A and 6B) when cover 10 is disengaged from blocker 302 and a retracted position (See FIGS. 6G and 6H) when cover 10 is engaged with blocker 302. According to an exemplary embodiment, cover 10 may comprise an edge configured to move blocker 302 from the deployed position to the retracted position. Gap G3 may be sized to receive cover 10. According to an exemplary embodiment, blocker 302 may be configured to prevent an object on a top surface of cover 10 from moving from cover 10 into component 3000. According to an exemplary embodiment, blocker 302 may be configured to retain an object on a top surface of cover 10 as cover 10 moves between the rearward position and the forward position.

According to an exemplary embodiment, connector 310 may be configured to couple mechanism 300 to base 23 and may be coupled to blocker 302 to facilitate movement between the deployed position and the retracted position. As shown schematically in FIG. 6B, mechanism 300 may comprise at least one pivot 310P coupled to connector 310 and engaged with base 23. Spring 320 may be configured to engage with base 23 and provide a biasing force to blocker 302. According to an exemplary embodiment, spring 320 may be configured to engage base 23 at a notch 23N (tab, protrusion, slot, etc.). The biasing force may bias blocker 302 in the deployed position. According to an exemplary embodiment, spring 320 may comprise a single spring or series of springs configured to pivot blocker 302 to the retracted position when blocker 302 is subjected to a force greater than the biasing force.

According to an exemplary embodiment as shown schematically in FIGS. 6A to 6D, cover 10 is in the rearward position. Cover 10 may be configured to completely expose compartment 33, completely cover compartment 33, or partially cover a rear portion of compartment 33 dependent on the length of cover 10 and the size of compartment 33 when cover 10 is in the rearward position. When cover 10 is in the rearward position, cover 10 may be configured to disengage blocker 302 with sufficient force to overcome the biasing force from spring 320. As shown schematically in FIGS. 6C and 6D, the edge of cover 10 may be configured to rest against blocker 120 to enclose compartment 33. When cover 10 is in the rearward position, blocker 302 may be in the deployed position blocking gap G3, spring 320 may be in a rest state applying the biasing force to blocker 302, and connector 310 may be in a horizontal or raised position relative to pivot 310P.

Figure 6E:
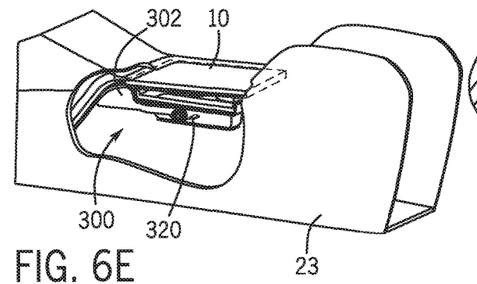
FIG. 6E is a schematic perspective cut away view of a component of a vehicle interior with a mechanism transitioning from a deployed position to a retracted position according to an exemplary embodiment.
Figure 6F:
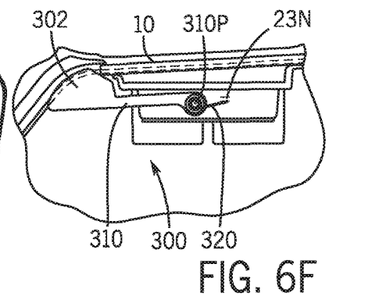
FIG. 6F is a schematic cut away side view of a component of a vehicle interior with a mechanism transitioning from a deployed position to a retracted position according to an exemplary embodiment.

According to an exemplary embodiment as shown schematically in FIGS. 6E and 6F, cover 10 is in the intermediate position. Cover 10 may be configured to completely cover compartment 33 or partially cover a forward portion of compartment 33 dependent on the length of cover 10 and the size of compartment 33 when cover 10 is in the intermediate position. As cover 10 moves from the rearward position to the intermediate position, the edge of cover 10 may engage blocker 302 with a force greater than the biasing force to begin moving blocker 302 from the deployed position to the retracted position. As the edge of cover 10 engages blocker 302, spring 320 may begin to rotate such that connector 320 may begin to pivot about pivot 320P so as to move blocker 302 toward the retracted position.

Figure 6G:
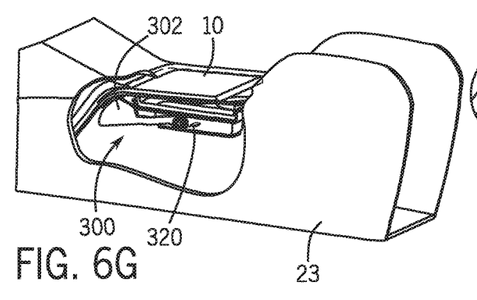
FIG. 6G is a schematic perspective cut away view of a component of a vehicle interior with a mechanism in a retracted position according to an exemplary embodiment.
Figure 6H:
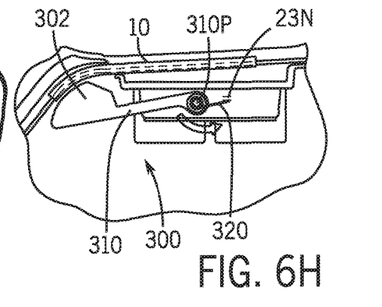
FIG. 6H is a schematic cut away side view of a component of a vehicle interior with a mechanism in a retracted position according to an exemplary embodiment.

According to an exemplary embodiment as shown schematically in FIGS. 6G and 6F, cover 10 is in the forward position. Cover 10 may be configured to completely expose compartment 33, completely cover compartment 33, or partially cover the forward portion of compartment 33 dependent on the length of cover 10 and the size of compartment 33 when cover 10 is in the forward position. When cover 10 is in the forward position, cover 10 may be configured to be fully engaged with blocker 302 with sufficient force to overcome the biasing force from spring 320. When cover 10 is in the forward position, blocker 302 may be in the retracted position exposing gap G3 to allow cover 10 to pass through gap G3, spring 320 may be in a rotated state, and connector 320 may be in a lowered position relative to pivot 310P. According to an exemplary embodiment, when cover 10 is in the forward position and spring 320 is rotated, spring 320 may continue to provide the biasing force to blocker 302 which in turn may bias cover 10 upwards to contact an upper inner surface of component 3000. Cover 10 contacting the upper inner surface of component 3000 may block gap G3 with the upper surface of cover 10 (See FIG. 6H).

According to an exemplary embodiment, component 3000 may comprise a second mechanism opposite mechanism 300. The second mechanism may be configured to selectively engage cover 10 and to close or block a second gap formed in the rearward portion of component 3000 as cover 10 moves from the rearward position to the intermediate or open position. The second mechanism may be configured identically to mechanism 300 with a second blocker being equivalent to blocker 302. The second blocker may be configured to move between a deployed position when cover 10 is not engaged with the second blocker and a retracted position when cover 10 is engaged with the second blocker.

According to an exemplary embodiment as shown schematically in FIGS. 7A to 7H, a component 4000 (e.g. vehicle trim component, console, center console, floor console, storage compartment, arm rest, etc.) for a vehicle interior is shown. Component 4000 may comprise a base 24, a compartment 34, a cover 10, and a mechanism 400. Cover 10 may be coupled to base 24 and configured to move relative to compartment 34. According to an exemplary embodiment, cover 10 may be configured to move from a closed position or rearward position to an open position or forward position through an intermediate position. According to an exemplary embodiment, cover 10 may be configured to be stored within a forward position of component 4000 (see FIGS. 7G and 7H), a rearward portion of component 4000 (see FIGS. 7A and 7B), or both. According to an exemplary embodiment, cover 10 may provide a shelf or cover for a second compartment in the rearward portion of component 4000.

Figure 7A:
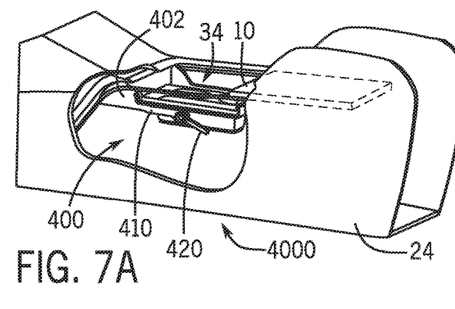
FIG. 7A is a schematic perspective cut away view of a component of a vehicle interior with a mechanism in a deployed position according to an exemplary embodiment.
Figure 7B:
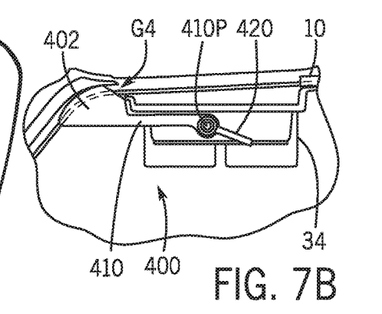
FIG. 7B is a schematic cut away side view of a component of a vehicle interior with a mechanism in a deployed position according to an exemplary embodiment.
Figure 7C:
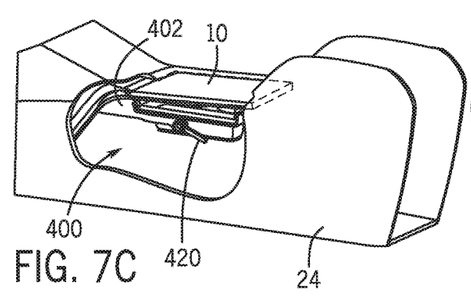
FIG. 7C is a schematic perspective cut away view of a component of a vehicle interior with a mechanism in a deployed position according to an exemplary embodiment.
Figure 7D:
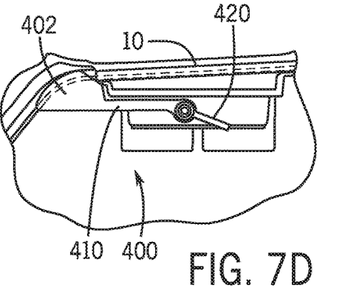
FIG. 7D is a schematic cut away side view of a component of a vehicle interior with a mechanism in a deployed position according to an exemplary embodiment.

According to an exemplary embodiment as shown schematically in FIGS. 7A and 7B, mechanism 400 may be coupled to base 24 and may be configured to selectively engage with cover 10. Mechanism 400 may comprise a blocker 402, a connector 410, and a weight 420. Blocker 402 may be configured to move between a deployed position covering a gap G4 between the compartment 34 and base 24 (See FIGS. 7A and 7B) when cover 10 is disengaged from blocker 402 and a retracted position (See FIGS. 7G and 7H) when cover 10 is engaged with blocker 402. According to an exemplary embodiment, cover 10 may comprise an edge configured to move blocker 402 from the deployed position to the retracted position. Gap G4 may be sized to receive cover 10. According to an exemplary embodiment, blocker 402 may be configured to prevent an object on a top surface of cover 10 from moving from cover 10 into component 4000. According to an exemplary embodiment, blocker 402 may be configured to retain an object on a top surface of cover 10 as cover 10 moves between the rearward position and the forward position.

According to an exemplary embodiment, connector 410 may be configured to couple mechanism 400 to base 24 and may be coupled to blocker 402 to facilitate movement between the deployed position and the retracted position. As shown schematically in FIG. 7B, mechanism 400 may comprise at least one pivot 410P coupled to connector 410 and engaged with base 24. Weight 420 may be configured to engage with base 24 and provide a biasing force to blocker 402. The biasing force may bias blocker 402 in the deployed position. According to an exemplary embodiment, weight 420 may comprise a counterweight coupled to connector 410 configured to pivot blocker 402 to the retracted position when blocker 402 is subjected to a force greater than the biasing force.

According to an exemplary embodiment as shown schematically in FIGS. 7A to 7D, cover 10 is in the rearward position. Cover 10 may be configured to completely expose compartment 34, completely cover compartment 34, or partially cover a rear portion of compartment 34 dependent on the length of cover 10 and the size of compartment 34 when cover 10 is in the rearward position. When cover 10 is in the rearward position, cover 10 may be configured not to engage blocker 402 with sufficient force to overcome the biasing force from weight 420. As shown schematically in FIGS. 7C and 7D, the edge of cover 10 may be configured to rest against blocker 120 to enclose compartment 34.

When cover 10 is in the rearward position, blocker 402 may be the deployed position blocking gap G4, weight 420 may be a rest state applying the biasing force to blocker 402, and connector 410 may be in a horizontal or raised position relative to pivot 110P.

Figure 7E:
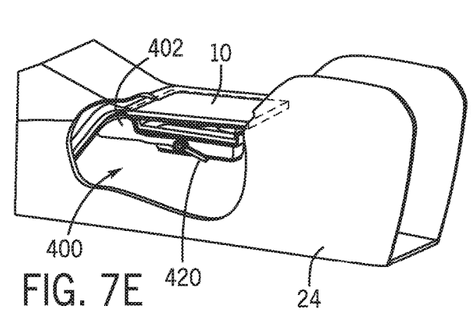
FIG. 7E is a schematic perspective cut away view of a component of a vehicle interior with a mechanism transitioning from a deployed position to a retracted position according to an exemplary embodiment.
Figure 7F:
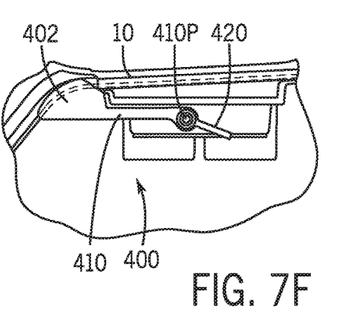
FIG. 7F is a schematic cut away side view of a component of a vehicle interior with a mechanism transitioning from a deployed position to a retracted position according to an exemplary embodiment.

According to an exemplary embodiment as shown schematically in FIGS. 7E and 7F, cover 10 is in the intermediate position. Cover 10 may be configured to completely cover compartment 34 or partially cover a forward portion of compartment 34 dependent on the length of cover 10 and the size of compartment 34 when cover 10 is in the intermediate position. As cover 10 moves from the rearward position to the intermediate position, the edge of cover 10 may engage blocker 402 with a force greater than the biasing force to begin moving blocker 402 from the deployed position to the retracted position. As the edge of cover 10 engages blocker 402, weight 420 may begin to rotate such that connector 420 may begin to pivot about pivot 420P so as to move blocker 402 toward the retracted position.

Figure 7G:
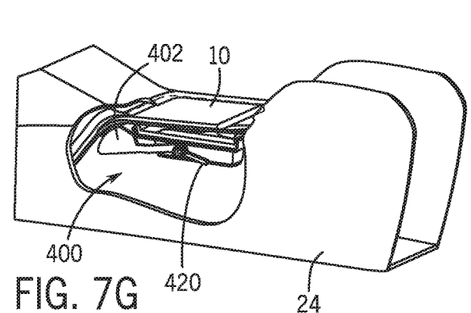
FIG. 7G is a schematic perspective cut away view of a component of a vehicle interior with a mechanism in a retracted position according to an exemplary embodiment.
Figure 7H:
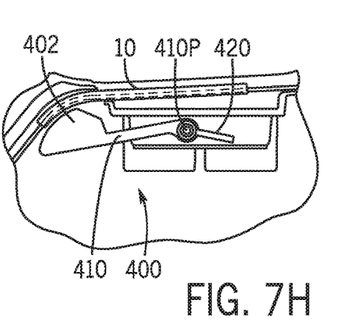
FIG. 7H is a schematic cut away side view of a component of a vehicle interior with a mechanism in a retracted position according to an exemplary embodiment.

According to an exemplary embodiment as shown schematically in FIGS. 7G and 7F, cover 10 is in the forward position. Cover 10 may be configured to completely expose compartment 34, completely cover compartment 34, or partially cover the forward portion of compartment 34 dependent on the length of cover 10 and the size of compartment 34 when cover 10 is in the forward position. When cover 10 is in the forward position, cover 10 may be configured to be fully engaged with blocker 402 with sufficient force to overcome the biasing force from weight 420. When cover 10 is in the forward position, blocker 402 may be the retracted position exposing gap G4 to allow cover 10 to pass through gap G4, weight 420 may be in a rotated state, and connector 420 may be in a lowered position relative to pivot 110P. According to an exemplary embodiment, when cover 10 is in the forward position and weight 420 is rotated, weight 420 may continue to provide the biasing force to blocker 402 which in turn may bias cover 10 upwards to contact an upper inner surface of component 4000. Cover 10 contacting the upper inner surface of component 4000 may block gap G4 with the upper surface of cover 10 (See FIG. 7H).

According to an exemplary embodiment, component 4000 may comprise a second mechanism opposite mechanism 400. The second mechanism may be configured to selectively engage cover 10 and to close or block a second gap formed in the rearward portion of component 4000 as cover 10 moves from the rearward position to the intermediate or open position. The second mechanism may be configured identically to mechanism 400 with a second blocker being equivalent to blocker 402. The Second blocker may be configured to move between a deployed position when cover 10 is not engaged with the second blocker and a retracted position when cover 10 is engaged with the second blocker.

It is important to note that the construction and arrangement of the elements of the inventive concepts and inventions as described in this application and as shown in the figures above is illustrative only. Although some embodiments of the present inventions have been described in detail in this disclosure, those skilled in the art who review this disclosure will readily appreciate that many modifications are possible without materially departing from the novel teachings and advantages of the subject matter recited. Accordingly, all such modifications are intended to be included within the scope of the present inventions. Other substitutions, modifications, changes and omissions may be made in the design, operating conditions and arrangement of the preferred and other exemplary embodiments without departing from the spirit of the present inventions.

It is important to note that the system and method of the present inventions can comprise conventional technology (e.g. as implemented in present configuration) or any other applicable technology (present or future) that has the capability to perform the functions and processes/operations indicated in the FIGURES. All such technology is considered to be within the scope of the present inventions and application.

The invention claimed is:

1. A vehicle trim component comprising:
   (a) a base;
   (b) a cover coupled to the base configured for movement from a closed position to an open position; and
   (c) a mechanism coupled to the base;
   wherein the mechanism comprises a blocker configured for movement between a deployed position and a retracted position;
   wherein the mechanism comprises at least one counterweight;
   wherein the counterweight is configured to rotate the blocker from the retracted position toward the deployed position.

2. The vehicle trim component of claim 1 wherein the mechanism comprises a spring configured to move the blocker from the retracted position to the deployed position.

3. The vehicle trim component of claim 2 wherein the mechanism comprises at least one pivot engaged with the base.

4. The vehicle trim component of claim 3 wherein the spring is engaged with the pivot and is configured to rotate the blocker about the pivot from the retracted position toward the deployed position.

5. The vehicle trim component of claim 1 wherein the at least one counterweight comprises a counterweight.

* * * * *